UNITED STATES PATENT OFFICE.

JAMES MILLAR NEIL, OF TORONTO, ONTARIO, CANADA.

PROCESS OF TREATING THE RESIDUAL CAUSTIC LIQUOR RESULTING FROM DIGESTION OF WOOD.

1,047,132.   Specification of Letters Patent.   Patented Dec. 10, 1912.

No Drawing.   Application filed January 26, 1912.   Serial No. 673,642.

*To all whom it may concern:*

Be it known that I, JAMES MILLAR NEIL, of Toronto, in the county of York, Province of Ontario, Dominion of Canada, have invented certain new and useful Improvements in Processes of Treating the Residual Caustic Liquor Resulting from Digestion of Wood; and I hereby declare that the following is a full, clear, and exact description thereof.

This invention relates to the art of making paper from wood pulp; and in particular is a novel improvement in the process of treating the residual black liquor obtained from the digesters, after the operation of treating wood therein with a caustic soda solution.

At present the residual liquor resulting from the operation of digesting wood with a caustic soda solution, in the art of paper making, is first evaporated to dryness; then the resultant dry mass is incinerated, thereby destroying the organic matter and converting the sodium compounds into sodium carbonate; this sodium carbonate is then dissolved in water and treated with lime to convert it into sodium hydrate. (Caustic soda.) In even small plants the quantity of such residual liquor produced is very great, and to evaporate it to dryness requires large and expensive apparatus, and the expenditure of a great deal of time and fuel, all of which adds greatly to the total cost of production of the paper.

It is the object of my invention to recover the sodium compounds from such residual liquors in the form of sodium hydrate (caustic soda) in solution, without the necessity of evaporating it; and also to recover the organic matters separately.

I attain these objects by my invention which consists in the novel process of treating such residual liquors hereinafter described in detail.

I have discovered that the organic impurities dissolved by and combined with the caustic soda solution, originally used in the treatment of the wood, can be thrown out of solution by means of an alkali metal compound of an acid forming metal (such as sodium aluminate, and sodium zincate), when sufficient carbonic acid is present in the solution, and more especially so is this effected, if the solution is heated, and agitated, a quick and effective method to obtain the necessary carbonic acid is to add sodium bicarbonate to the liquor containing such alkali metal compound, the heat causing the liberation of carbonic acid from the sodium bicarbonate. Similar results may be obtained by passing carbonic acid gas through the solution either at normal atmospheric pressure or at an increased pressure.

In the utilization of my invention an economical efficient and rapid way of carrying the same out in practice is as follows:—
The residual liquor which separates from the wood pulp is run into a suitable tank or apparatus; then a sufficient quantity of an alkali metal compound of an acid forming metal is added thereto to combine with the tars, gums, resins, etc. The amount of such alkali compound required varies naturally with the class of wood undergoing treatment, and is found by laboratory tests at the place of treatment. This mixture is then preferably heated and agitated, and to this there is then added sufficient sodium bicarbonate to not only precipitate the alkali metal compound but also to throw down organic compounds in the mixture which are not affected by the alkali metal compound. After the organic matters and acid forming metal are precipitated, the clear solution of sodium compound may be separated from the precipitates by filtration, or by any other desired or preferred system; and such clear solution is then treated with lime, or "causticized," in order to convert the carbonate present in the solution into hydrate, after which such caustic soda solution may be re-used in treating fresh charges of wood in the digesters.

In the finished caustic soda solution, it is sometimes found that there remain certain organic compounds which have not been precipitated by the above described treatment. Such being the case, I have found that these organic compounds can be eliminated entirely by subjecting them to the action of oxygen, preferably in the form of ozone, derived either by means of an ozone machine or by electrolysis.

The precipitates obtained in this process may be collected and eventually incinerated when desired; and in such case the alkali compound of an acid forming metal used as a precipitant can be recovered from the ashes in the form of an oxid, which oxid may be dissolved in caustic soda and reused to precipitate the organic matters in other batches of residual liquor. Or, if preferred, the precipitates may be eventually treated with a solvent such as benzin, etc. whereby the organic matters (gums, resins, etc.) will be dissolved, and may be separated from the insoluble precipitates by withdrawing the solvent therefrom. The gums, resins, etc., may afterward be separated from the solvent by distillation. The metallic matters, remaining after such treatment by benzin, may be then heated and dissolved in sodium hydrate to form an alkali compound of an acid forming metal for use on a fresh batch of liquor.

For economical reasons I prefer to use sodium aluminate in my process as it gives excellent results.

It should be noted that I do not evaporate the residual liquor but separate the soda solution therein from the precipitated organic matters; and the subsequent treatment of such precipitates is not an essential feature of the invention.

As an illustration of the advantages and utility of my process; if a paper mill produces say 125,000 gallons of residual liquor per diem, all this heretofore had to be evaporated to dryness and the residuum burned and then treated to recover the caustic soda; whereas in my process no evaporation is required, and only about four or five tons of precipitates would be obtained.

What I claim is:

1. The herein described process of recovering caustic liquor, consisting in treating residual caustic liquor with an alkali metal compound of an acid forming metal in the presence of carbonic acid to precipitate the organic matters in such liquor, and then separating the clear liquor from the precipitate, and treating such liquor with lime, substantially as described.

2. The herein described process of recovering caustic liquor, consisting in treating residual caustic liquor with an alkali metal compound of an acid forming metal in the presence of carbonic acid to precipitate the organic matters in such liquor, and then separating the clear liquor from the precipitate, and treating such liquor with oxygen, substantially as described.

3. The herein described process of recovering caustic liquor, consisting in treating residual caustic liquor with an alkali metal compound of an acid forming metal in the presence of carbonic acid gas to precipitate the organic matters in such liquor, and then separating the clear liquor from the precipitates, and causticizing such liquor.

4. The herein described process of recovering caustic liquor, consisting in treating residual caustic liquor with an alkali metal compound of an acid forming metal in the presence of carbonic acid gas to precipitate the organic matters in such liquor, then separating the clear liquor from the precipitates, and then treating such liquor with ozone.

5. The herein described process of recovering caustic liquor, consisting in treating the liquor obtained from digesters in the treatment of wood pulp with an alkali metal compound of an acid forming metal in the presence of carbonic acid gas and heat to precipitate the organic matters in the liquor; separating the clear liquor from the precipitates; and causticizing it.

6. The herein described process of recovering caustic liquor, consisting in treating the liquor obtained from digesters in the treatment of wood pulp with an alkali metal compound of an acid forming metal in the presence of carbonic acid gas and heat to precipitate the organic matters in the liquor; separating the clear liquor from the precipitates, treating it with oxygen, and causticizing it.

7. The herein described process of treating the residual liquor obtained from digesters in the treatment of wood pulp, consisting in applying to such liquor sodium aluminate to precipitate the organic matters in such liquor then separating the clear liquor from the precipitates and treating such liquor with lime, substantially as described.

8. The herein described process of treating the residual liquor obtained from digesters in the treatment of wood pulp, consisting in applying to such liquors an alkali metal compound of an acid forming metal and sodium bicarbonate to precipitate the organic matters in such liquors, then separating the clear liquor from the precipitates and treating such liquor with lime, substantially as described.

9. The herein described process of treating the residual liquor obtained from digesters in the treatment of wood pulp, consisting in applying sodium aluminate to such liquor in the presence of carbonic acid gas to precipitate the organic matters in such liquor, and then separating the clear liquor from the precipitates, and causticizing such liquor.

10. The herein described process of treating the residual liquor obtained from digesters in the treatment of wood pulp, consisting in applying sodium aluminate and sodium bicarbonate to such liquor to precipitate the organic matters in such liquor, and then separating the clear liquor from the precipitates, and causticizing such liquor.

11. The herein described process of treating the residual liquor obtained from digesters in the treatment of wood pulp consisting in applying to such liquors while heated sodium aluminate and carbonic acid gas to precipitate the organic matters, separating the clear liquor from the precipitates, and causticizing the clear liquor.

12. The herein described process of treating the residual liquor obtained from digesters in the treatment of wood pulp consisting in applying to such liquors while heated sodium aluminate and sodium bicarbonate to precipitate the organic matters, separating the clear liquor from the precipitates, treating such liquor with oxygen, and causticizing the clear liquor.

In testimony that I claim the foregoing as my own, I affix my signature in presence of two witnesses.

JAMES MILLAR NEIL.

Witnesses:
 RUSSELL H. HAWK,
 GRACE F. NIEMANN.